June 23, 1931. J. H. TAYLOR 1,811,733
TRACTOR PLOW
Filed Nov. 19, 1928 3 Sheets-Sheet 1
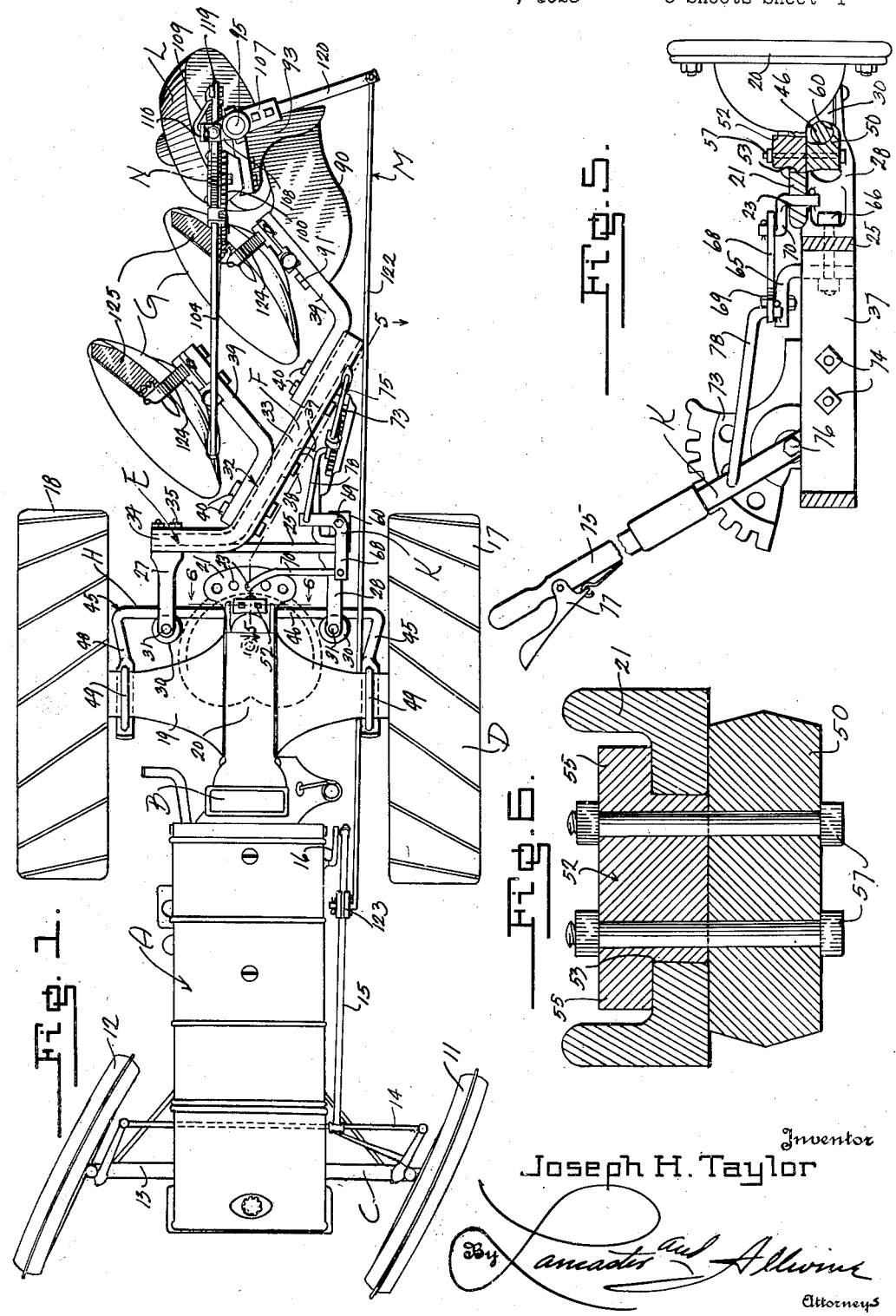
Inventor
Joseph H. Taylor
By Lancaster and Allwine
Attorneys

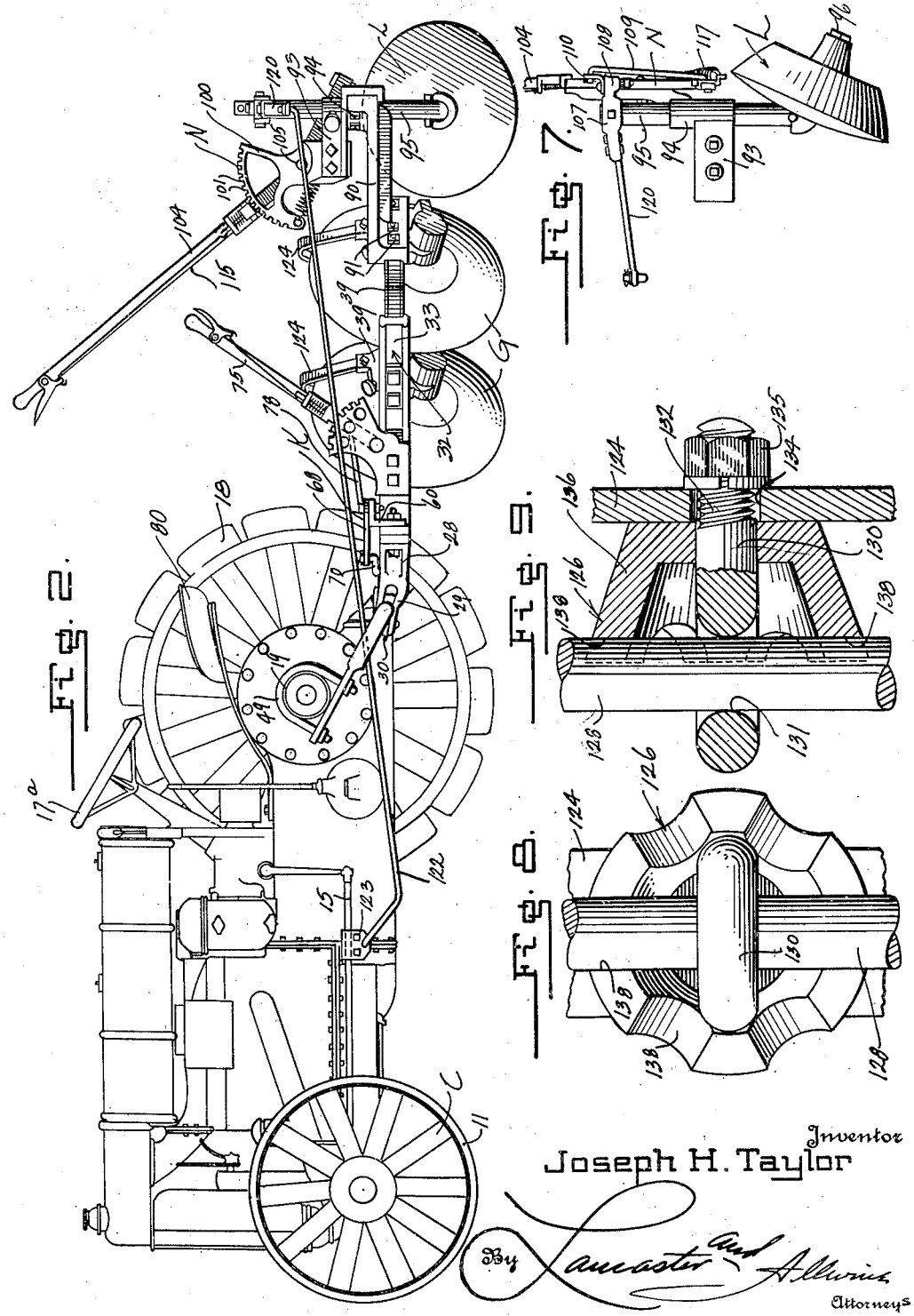

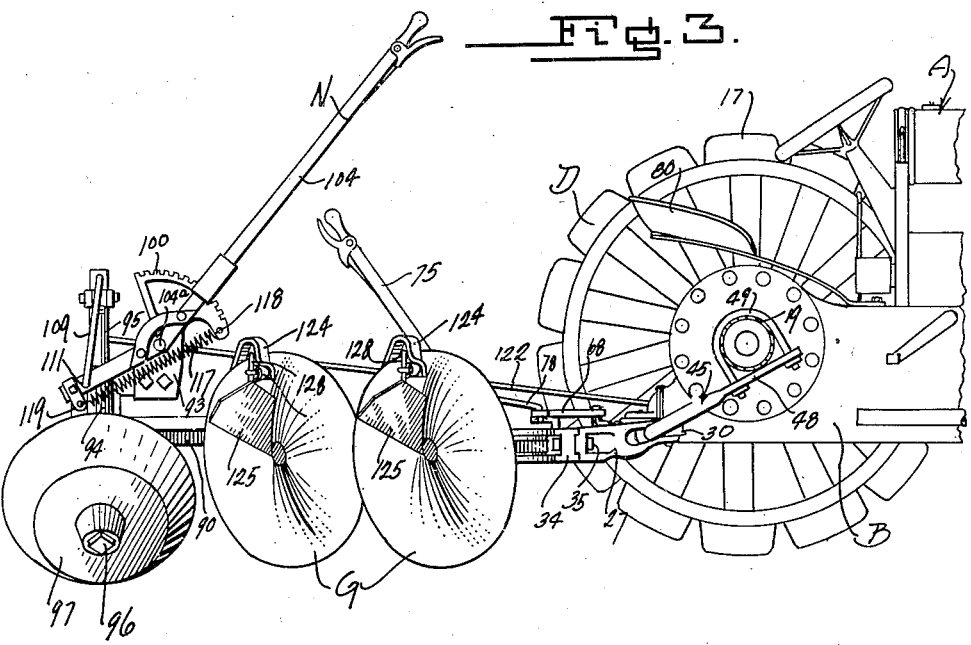
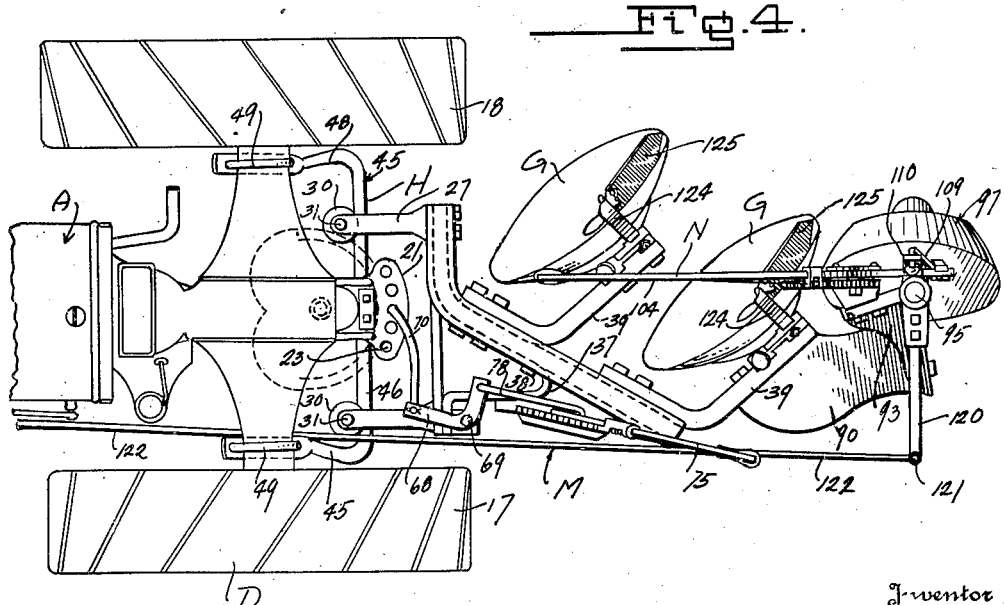

Patented June 23, 1931

1,811,733

UNITED STATES PATENT OFFICE

JOSEPH HERSCHEL TAYLOR, OF ATHENS, TENNESSEE

TRACTOR PLOW

Application filed November 19, 1928. Serial No. 320,367.

This invention relates to improvements in plows.

The primary object of this invention is the provision of a tractor plow, in which the plow is connected to the rear of a tractor, in such relation that the same may be controlled with facility in an automatic relation with the steering mechanism of the tractor.

A further object of this invention is the provision of an improved plow construction, adapted to be connected to a conventional tractor, such as the Fordson tractor, at the rear thereof, embodying an improved connection with the tractor.

A further object of this invention is the provision of an improved tractor plow embodying a plow frame connected in a novel relation to the tractor so that the same may be shifted efficiently in a novel relation laterally of the longitudinal axis of the tractor.

A further object of this invention is the provision of an improved tractor plow having a novel and durable frame construction.

A further object of this invention is the provision of an improved tractor plow comprising a frame having means to connect the same at the front thereof to a rear end of the tractor, and having a single heavily weighted caster wheel at the rear end thereof.

A further object of this invention is the provision of an improved tractor plow adapted to be connected at the rear end of the tractor and embodying improved control means for elevating and lowering the rear end of the plow.

A further object of this invention is the provision of an improved tractor plow embodying a novel assemblage of frame and operating details, and including a single rear supporting weighted caster wheel connected for automatic steering with the steering gear of the vehicle to which it is attached.

Other objects and advantages of this invention will be apparent during the course of the following detailed description.

In the accompanying drawings, forming a part of this specification, and wherein similar reference characters designate corresponding parts throughout the several views, Figure 1 is a plan view of a tractor, showing the improved tractor plow hitched thereto.

Figure 2 is a side elevation of the improved plow, showing the same hitched to the tractor.

Figure 3 is an opposite side elevation of the improved plow and its connection to the rear end of the tractor.

Figure 4 is a plan view of the plow, showing its connection to the rear of the tractor, the view differing from Figure 1 in the arrangement of steering mechanism for the caster wheel of the plow.

Figures 5 and 6 are cross sectional views taken substantially on their respective lines in Figure 1 of the drawings.

Figure 7 is a front elevation of the plow supporting caster wheel and associated supporting and operating means of the plow.

Figure 8 is an enlarged view showing means for adjustably mounting a scraper blade on a plow disc of the improved plow.

Figure 9 is a sectional view taken thru the details illustrated in Figure 8.

In the drawings, wherein for the purpose of illustration is shown only a preferred embodiment of the invention, the letter A may generally designate a tractor, which may comprise a chassis B having front steering and running gear C, and including rear traction and running gear D. The improved plow E comprises a frame F, connected by means H to the frame of the tractor, with control means K for operating the frame F transversely with respect to the tractor A, for shifting the earth engaging elements G carried by the frame F. The frame F is supported at the rear end thereof by a weighted caster wheel L mounted thereon. Means N is provided to elevate and lower the frame with respect to the caster wheel L for raising and lowering the plows G. Means M is provided for connecting the caster wheel F for a steering action with the steering gear of the tractor A.

In the conventional tractor, the front running and steering gear includes the steering wheels 11 and 12 pivoted upon the ends of the front axle 13. To the steering arms thereof a tie rod 14 is connected, and the steering gear furthermore includes a drag link 15 extending rearwardly to a steering lever 16 suitably connected with a steering post and wheel 17ᵃ.

The rear running and traction gear D, of course includes the traction wheels 17 and 18 suitably connected upon a rear axle housing 19, and which housing includes a differential casing 20 having a draw bar cap 21 placed thereon at the rear thereof, midway between the rear traction wheels 17 and 18. The draw bar cap 21 is of the usual formation, provided thereacross with a plurality of openings 23, for receiving couplings in any approved relation thereacross. The draw bar cap 21 is of course attached to that part of the tractor which is best adapted to withstand strains incident to the attachment of a plow, and therefore it is desirable that the forces incident to plowing shall be placed primarily thereon.

Referring to the frame F, the same includes a beam 25 which has supporting brackets 27 and 28 connected at the ends thereof in right angled relation therewith, as shown in Figure 1 of the drawings. These brackets 27 and 28 are bifurcated at their free ends, as shown at 29 in Figure 2 of the drawings, and rollers 30 are rotatably supported on pins 31 at the free ends of these brackets, for operating on the means H which connects the frame F to the tractor. A plow beam 32 is provided, of heavy I-shaped cross section, comprising an elongated straight body portion 33, having an angled attaching foot 34 which is bolted at 35 to the right end of the cross beam 25, so that the portion 33 of the plow beam extends diagonally rearwardly in acute angled relation with respect to the beam 25. A brace beam 37 is connected at the opposite end of the cross beam 25 from the plow beam 32, and the brace beam 37 at its other end is connected at 38 to the portion 33 of the plow beam 32 between the ends thereof, as can be seen from Figures 1 and 4.

The plow disc bracket arms 39 are bolted at 40 to the plow beam portion 33, and these brackets extend rearwardly in acute angled relation with respect to the plow beam portion 33, and rotatably support plow discs G at the free ends thereof, with any approved construction. Due to the diagonal position of the beam portion 33 with respect to the longitudinal axis of the tractor and the plow E, it is of course apparent that the plow discs G will plow different furrows as the tractor travels forwardly. The rear end of the plow E is of course supported thru the caster wheel L and other frame details, to be subsequently mentioned.

Referring now to the means H which is used to connect the forward part of the plow E to the tractor A, the same includes a substantially U-shaped coupling beam 45, including the body portion 46 having forwardly diverging legs 48 at the ends thereof. The legs 48 are provided with U-shaped clamp bolts 49 at the ends thereof for connection to the axle housing 19 of the tractor, in order that the body portion 46 of the coupling beam 45 may be positioned transversely at right angles to the longitudinal axis of the tractor, behind the axle housing 19. The body portion 46 of the coupling beam 45 has a definite relation with respect to the draw bar cap 21, by means of which the latter may take the strain incident to plowing. To this end, a clamp block 50, of metal or other approved material, is provided, adapted to be placed below and in abutment with the draw bar cap 21, as shown in Figures 5 and 6 of the drawings. A supporting block 52 of T-shaped formation, is provided, adapted to seat in the socket 53 formed in the draw bar cap 21, as shown in Figures 5 and 6 of the drawings. The laterally projecting ends 55 of the block 52 seat on the upper surface of the draw bar cap 21, as shown in Figure 6, and the lower reduced portion of the block 52 fits into the socket 53. Pairs of aligning passageways are provided in the blocks 50 and 52, for receiving clamping bolts 57, by means of which the blocks may be connected at opposite sides of the draw bar cap 21. The block 50 is provided with a forwardly facing transverse socket or seat 60, adapted to receive the body portion 46 of the coupling beam 45, midway between the ends thereof.

In assemblage, the U-shaped coupling beam 45 is received in the spaces at the bifurcated ends of the frame brackets 27 and 28, and the rollers 30 operate on the front edge of the body portion 46 of the coupling beam, at opposite sides of the draw bar cap 21, as shown in Figure 1 of the drawings. It is thus apparent that the frame F may be transversely moved with respect to the longitudinal axis of the tractor and plow, as the rollers 30 move over and along the coupling beam body 46. Furthermore the draft is directly transmitted to the draw bar cap incident to its coupled connection of the coupling beam at opposite sides of the draw bar cap.

Referring to the means K for controlling the lateral shift of the frame F upon the means H, by which it is connected to the tractor, an extension clip 65 is connected to an end of the beam 25, preferably by the same bolt means 66 which is used to connect the attaching bracket 28 thereto, as shown in Figure 5 of the drawings. This clip 65 has an upper portion which extends above the top edge of the beams 25 and 37, and upon which a bell crank lever 68 is pivoted at 69. The bell crank lever 68 at one end thereof has a connecting link 70 pivoted thereto in a detachable manner; the other end of the connecting link 70 being adjustably mounted upon the draw bar cap in any of the openings 23 thereof. The operating means K furthermore includes a toothed sector 73 clamped at 74 upon the beam 37, as shown in Figure 5 of the drawings. On the sector 73 an operating lever 75 is pivoted at 76; the said operating lever including the usual pawl mechanism 77 for engagement with the teeth of the sector 73. To the operating lever 75, above the pivot 76 thereof, is pivotally connected a rod 78, which at the opposite end thereof is pivoted to the bell crank lever 68 at the opposite side of the pivot thereof from that end to which the link 70 is provided, as is shown in Figure 1 of the drawings.

The lever 75 is conveniently positioned at the left side of the tractor and plow frame, so that the rider upon the tractor seat 80, may reach rearwardly and to the left and grasp the operating lever 75 for moving the same forwardly or rearwardly on its pivot 76. Moving the lever 75 forwardly will cause the bell crank lever 68 to rock on its pivot 69, and inasmuch as the one end of the bell crank lever 68 is connected to the connecting link 70, and the latter is connected to the draw bar cap, it is apparent that the frame F will move to the right; the rollers 30 sliding along the coupling beam 45. This permits the plow disc 41 to be positioned in different spaced relations with respect to the longitudinal axis of the tractor, for enabling a change in the width of a furrow cut. This makes the plow ideal for "rolly" or "hilly" land. Of course the initial adjustment may be taken care of by placing the connecting link 70 in any of the openings 23 of the draw bar cap, and any lateral shift is subsequently taken up thru the operating means K, as is readily apparent from the foregoing.

Referring to the support of the rear end of the tractor, a heavy weighted bracket 90 is bolted at 91, see Figure 2, to the plow disc bracket arm 39, and it extends rearwardly, and at the rear end thereof it is provided with a detachable bracket 93, connected at 94 thereto. The bracket 93 has a sleeve portion 94, shown in Figure 7 of the drawings, provided with a vertical passageway therethrough which vertically slidably and rotatably receives a caster wheel shaft 95 therethrough. The shaft 95 at the lower end thereof is provided with the angled spindle 96 which rotatably receives the weighted caster wheel L thereon. The caster wheel L is a heavy iron wheel, which together with the weighted bracket 90 is sufficient to hold the disc plows into the ground for plowing purposes, and thus obviating the necessity of using other weight means. The caster wheel L is relatively thick and beveled, and of course disposed in a plane inclined to the vertical when on the caster wheel shaft 95.

The operating means N for raising and lowering the frame upon the caster wheel shaft 95, preferably consists of a sector 100 bolted upon the bracket 93 above described, to the rear of the shaft 95, as shown in Figure 2 of the drawings. The sector 100 is a two-piece sector, having the upwardly and forwardly facing teeth 101 thereon. This sector pivotally receives an operating lever 104 thereon, being pivoted at 104ª intermediate the ends thereof. The construction of the lever 104 with respect to its pivot is more particularly illustrated in Figure 3 of the drawings. Rigidly connected in a detachable relation upon the top of the shaft 95, above the sleeve 94, is a bracket 107, connected in a T-shaped relation on the top of the shaft 95, and at one side of the shaft 95 is an offset 108 to which the upper end of a connecting and supporting link 109 of the operating means N is connected, as shown in Figure 3 of the drawings, and also in Figure 7. This connecting link 109 is pivotally supported in a clip 110 on the offset 108. The connecting link 109 at its lower end is pivoted at 111 on the lever 104 at one end thereof. The lever 104 at the opposite side of the pivot 104ª has a handle and hand operated pawl means 115, operating on the teeth 101 of the sector 100, in usual manner. The parts of the operating lever 104 at opposite sides of its pivot axis 104ª are not in exact alignment, but in slight angular relation, less than 180°. This is for the purpose of efficiently receiving a powerful spiral spring 117, connected at one end at 118 to the sector 100, as shown in Figure 3 of the drawings, and at its opposite end being connected by a clip 119 to the lever arm 104 adjacent the pivot connection 111 of the link 109.

In operation, to raise and lower the rear end of the plow frame so as to raise and lower the plow discs with respect to the ground, it is merely necessary for the operator from the seat on the tractor to reach rearwardly and grasp the lever 104, open the pawl thereof, and lower or elevate the same. If it is desired to elevate the plow members G it is necessary for the operator to push rearwardly on the lever 104. This throws the rear end of the lever to which the link 109 is connected downwardly, and pulls the frame F upwardly, it being remembered that the caster wheel is resting on the ground and that the frame slides upwardly through its sleeve 94 on the shaft 95. The spring 117 is of course under expansion and assists the operator in lifting the frame, inasmuch as the spring is connected to the stationary sector 100 at one end thereof, at one side of the pivot axis 104ª and it is connected with the movable lower end of the lever 104 at its opposite end, pulling the lever 104 at its free end downwardly, from the position of details shown in Figure 3 of the drawings. To lower the plow frame, it is merely necessary to pull the lever 104 forwardly, after releasing the pawl thereof, and the weight of the frame of course is counteracted by the expansion of the spring 117, during this action; the said expansion storing up energy in the spring which will later permit the frame to be raised without excessive exertion upon the part of the operator.

The caster wheel L is automatically turned, to steer the rear end of the plow as an incident of steering of the tractor A. To this end, as shown in Figure 7 of the drawings, an arm 120 is rigidly connected with the bracket 107 on the top of the shaft 95, at the opposite side of said shaft from the offset 108. This steering arm 120 at its free end is pivoted at 121 with a forwardly extending connecting rod 122, which as shown in Figure 1 of the drawings, is clamped at 123 to the drag link 15 of the steering gear of the tractor, intermediate the ends of said drag link.

The operation of the tractor will be apparent from the foregoing. It is automatically steered by the means M to keep the plow discs in proper alignment with the tractor at all times, under all conditions, making it possible to back into corners, and also turn square corners if desired. The shifting device and connection of the plow with the tractor permits the lateral shifting of the plow upon the rear of the tractor, and makes it instantly possible to shift the plow as conditions demand, to vary the width of cut and the like. The three point suspension at the coupling beam 45 makes a very rigid hitch for the plow frame, and at the same time places the strain on the draw bar cap, and that part of the tractor which is designed to take the most strain. The operating lever for raising and lowering the plow discs is easily accessible to the operator and makes it possible to elevate the discs to the proper level according to the inoperative or operative condition of the tractor.

Novel scraping means is provided for each of the discs G preferably including a bracket arm 124 connected to the plow bracket arm 39 at one end and extending radially at the convex side and turned over towards the concave side of the disc, as shown in Figure 1 of the drawings. These bracket arms 124 at the concave sides of the plow discs G are provided with scraping blades 125, supported by adjustable means 126, more particularly detailed in Figures 8 and 9 of the drawings. Each of the scraping blades 125 has a rigid supporting post 128, shown in Figure 3, and these posts 128, as shown in Figures 8 and 9 of the drawings, are connected to the scraper blade supporting arms 124 by the means 126. The means 126 includes an eye bolt 130, provided with an eye 131 at one end thereof and at the opposite end being threaded at 132 and inserted through an opening 134 in the arm 124, to which it is clamped by bolt means 135. A hollow frusto-conical member 136, thru which the eye bolt 130 is provided; said frusto-conical member having its smaller end clamped against the arm 124, and at its outer end periphery is provided with diametrically opposed grooves 138, adapted to receive the shaft or rod 128 of the scraper blade, as shown in Figures 8 and 9 of the drawings. The post or rod 128 is of course threaded thru the eye of the clamping bolt 130, and the adjustment of the latter on the supporting arm 124 clamps the supporting post in the groove, to hold the same in a desired adjusted position, to gauge the scraping efficiency of the edge of the blade 125 with respect to the plow discs G, as illustrated in Figure 3. Thus, as the plow discs and its scraping blade 125 becomes worn, the adjustment may be taken up by means 126 above described.

Various changes in the shape, size, and arrangement of parts may be made to the form of invention herein shown and described, without departing from the spirit of this invention or the scope of the claims.

I claim:

1. In a tractor plow the combination of a tractor including rear running and traction gearing including an axle housing and a draw bar cap connected therewith between its ends, a hitch member connected at its ends to the axle housing and intermediate its ends having a coupled connection with the draw bar cap, a plow frame, and means connecting the plow frame with the hitch member at opposite sides of the draw bar cap for sliding movement along the hitch member and pivoted vertical movement.

2. In a tractor plow the combination of a tractor including a rear axle housing having a draw bar cap attached therewith, a substantially U-shaped hitch coupling including an elongated body portion with transversely turned legs, means connecting the legs to the axle housing at opposite sides of the draw bar cap, with the body portion of the hitch coupling extending rearwardly of and substantially parallel with the axle housing, said draw bar cap having an opening therethrough, a detachable clamp connected in said opening including a socket receiving the body portion of said coupling therein between its ends, a plow frame, and means slidably and pivotally connecting the plow frame to the body of the coupling hitch at opposite sides of the draw bar cap so that forces incident to plowing will be directly transmitted to said draw bar cap.

3. In a tractor plow the combination of a tractor including rear running and traction gearing having a draw bar cap attached therewith, a plow frame, means connecting the plow frame with the rear of the tractor so that the plow frame may shift laterally with respect to the tractor, a bell crank lever pivoted on said frame, a pivoted connecting rod connecting one end of the bell crank lever with the draw bar cap, and operating means mounted on the frame and connected with the other end of the bell crank lever so that upon movement thereof the frame may be shifted laterally with respect to the tractor.

4. In a tractor plow the combination of a tractor including a draw bar cap, a plow frame, a soil engaging implement for the plow frame, means connecting the plow frame with the rear of the tractor for lateral shift of the plow frame with respect to the tractor, an operating means to cause said lateral shift including a bell crank lever pivoted on the frame, a connecting rod pivoted to the bell crank lever at one end and to the draw bar cap at the other end, and means connected with the opposite end of the bell crank lever to cause a pivoted movement of the bell crank lever on its axis.

5. In a tractor plow the combination of a tractor including a draw bar cap having a number of openings therealong, a plow frame, means connecting the plow frame with the rear of the tractor for lateral shift of the plow frame with respect to the tractor, a bell crank lever pivoted on the frame, a connecting rod pivoted with an end of the bell crank lever and having an end for adjustable pivoting in either of the openings of the draw bar cap, an operating lever pivoted on the frame, means to hold the operating lever in different positions on the frame, and a connecting rod pivoted with the operating lever and with the other end of the bell crank lever.

6. In a tractor plow for attachment to tractors the combination of a main beam including a plow attaching body and an angled attaching piece in obtuse angular relation with respect thereto, a cross beam connected to said attaching piece and extending parallel therewith and beyond the end at which the plow attaching portion is connected and disposed in an acute angled relation therewith, a brace beam connecting the end of the cross beam and main beam remote from the attaching portion of the latter, means for attaching a soil engaging implement on the main beam, and detachable tractor attaching members connected at the ends of the cross beam transverse thereto at the opposite side thereof from the main beam.

7. In a tractor plow the combination of a plow frame for attachment at its front end to a tractor, a caster wheel including an upright shaft, means slidably connecting the rear end of the frame for vertical sliding along said shaft, an operating lever, means pivoting the operating lever between its ends on the rear end of the frame, the operating lever at one side of its pivot axis having an upwardly extending handle and at the opposite side having a downwardly extending portion, a connecting link connecting said portion at its lower end to the shaft at the upper end of the latter, a sector connected with the frame, a pawl operable on the handle of the lever and said sector for holding the lever in any of a number of different positions for elevating and lowering the same along said shaft, and a spring connected at one end to the sector and at the other end to the end of the lower portion of the lever and in a position to expand as the frame is lowered along said shaft whereby to facilitate lifting of the frame upon operation of said lever.

JOSEPH HERSCHEL TAYLOR.